United States Patent
Yamada et al.

(10) Patent No.: US 12,234,352 B2
(45) Date of Patent: Feb. 25, 2025

(54) RUBBERY COMPOSITION AND METHOD FOR PRODUCING THE SAME

(71) Applicants: OSAKA GAS CO., LTD., Osaka (JP); Osaka Gas Chemicals Co., Ltd., Osaka (JP)

(72) Inventors: Masahiro Yamada, Osaka (JP); Hiroki Sakamoto, Osaka (JP); Masayuki Sugimoto, Osaka (JP); Masayuki Hirota, Osaka (JP); Yumi Hosogi, Osaka (JP); Hiroaki Murase, Osaka (JP)

(73) Assignees: OSAKA GAS CO., LTD., Osaka (JP); OSAKA GAS CHEMICALS CO., LTD., Osaka (JP)

( * ) Notice: Subject to any disclaimer, the term of this patent is extended or adjusted under 35 U.S.C. 154(b) by 994 days.

(21) Appl. No.: 17/283,665

(22) PCT Filed: Nov. 22, 2019

(86) PCT No.: PCT/JP2019/045839
§ 371 (c)(1),
(2) Date: Apr. 8, 2021

(87) PCT Pub. No.: WO2020/110955
PCT Pub. Date: Jun. 4, 2020

(65) Prior Publication Data
US 2022/0010115 A1    Jan. 13, 2022

(30) Foreign Application Priority Data

Nov. 27, 2018  (JP) .................................. 2018-221514

(51) Int. Cl.
*C08L 23/16*    (2006.01)
*C08K 5/053*    (2006.01)
(Continued)

(52) U.S. Cl.
CPC .............. *C08L 23/16* (2013.01); *C08K 5/053* (2013.01); *C08K 7/02* (2013.01); *C08K 9/04* (2013.01); *C08L 1/02* (2013.01); *C08K 2201/011* (2013.01)

(58) Field of Classification Search
CPC .......... C08L 23/16; C08L 1/02; C08K 5/053; C08K 7/02; C08K 9/04; C08K 2201/011
(Continued)

(56) References Cited

U.S. PATENT DOCUMENTS 8,022,136 B2    9/2011    Yano et al.
2019/0300689 A1    10/2019    Arakawa et al.

FOREIGN PATENT DOCUMENTS

JP    2005-75856    3/2005
JP    2005-133025    5/2005
(Continued)

OTHER PUBLICATIONS

JP2016-172823 A—machine translation (Year: 2016).*
(Continued)

*Primary Examiner* — Ling Siu Cho
*Assistant Examiner* — Ronald Grinsted
(74) *Attorney, Agent, or Firm* — Wenderoth, Lind & Ponack, L.L.P.

(57) ABSTRACT

A rubbery composition is prepared by combining (A) a rubber component, (B) a cellulose, and (C) fluorene compound having a 9,9-bis(aryl)fluorene skeleton. The fluorene compound (C1) may be a compound represented by the following formula (1):

(Continued)

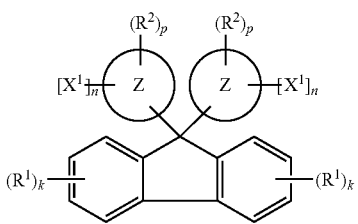

(1)

wherein a ring Z represents an arene ring, $R^1$ and $R^2$ represent a substituent, $X^1$ represents a heteroatom-containing functional group, k denotes an integer of 0 to 4, n denotes an integer of not less than 1, p denotes an integer of not less than 0. The rubbery composition has improved mechanical properties such as strength, elongation, and hardness.

15 Claims, 2 Drawing Sheets

(51) Int. Cl.
*C08K 7/02* (2006.01)
*C08K 9/04* (2006.01)
*C08L 1/02* (2006.01)

(58) Field of Classification Search
USPC .......................................................... 524/13
See application file for complete search history.

(56) References Cited

FOREIGN PATENT DOCUMENTS

| JP | 458116 | 11/2010 |
|---|---|---|
| JP | 2016-79370 | 5/2016 |
| JP | 2016-172823 | 9/2016 |
| JP | 2016172823 A * | 9/2016 |
| JP | 2019-178195 | 10/2019 |
| JP | 2019-183123 | 10/2019 |
| WO | 2017/026250 | 2/2017 |
| WO | 2019/188104 | 10/2019 |

OTHER PUBLICATIONS

Extended European Search Report issued Jun. 27, 2022 in corresponding European Patent Application No. EP 19 88 9478.
Office Action issued Dec. 7, 2023 in corresponding Chinese Patent Application No. 201980066606.6, with English translation.
International Search Report (ISR) issued Feb. 18, 2020 in International (PCT) Application No. PCT/JP2019/045839.
International Preliminary Report on Patentability and Written Opinion of the International Searching Authority issued May 25, 2021 in International (PCT) Application No. PCT/JP2019/045839.

* cited by examiner

[Fig. 1]
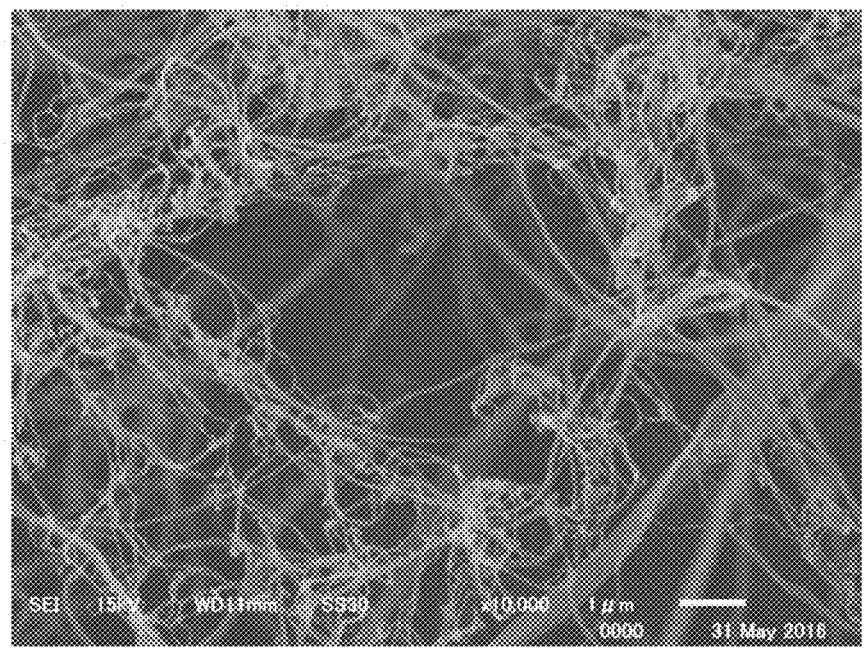
[Fig. 2]
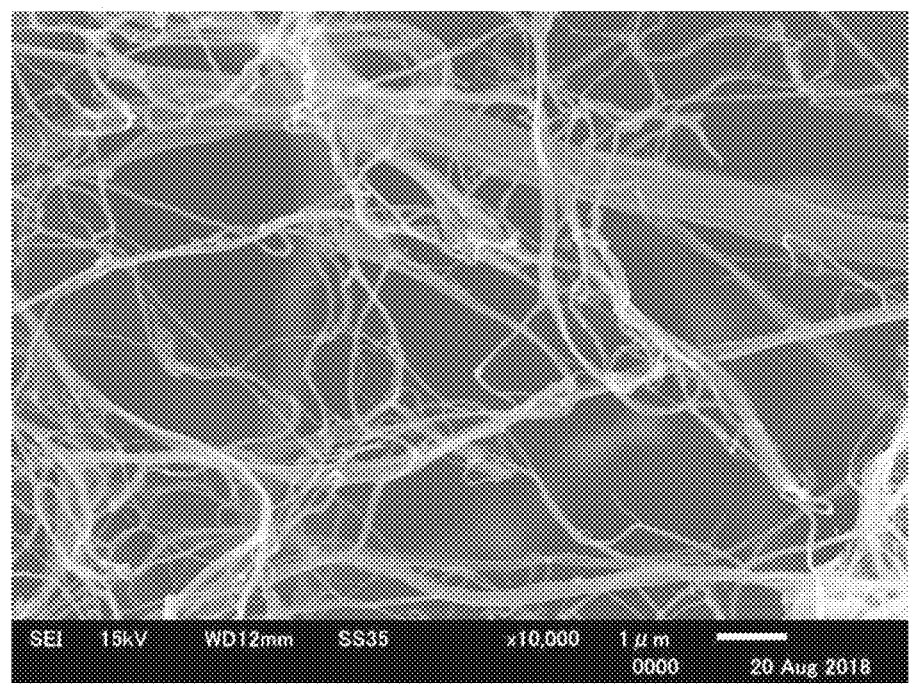

[Fig. 3]
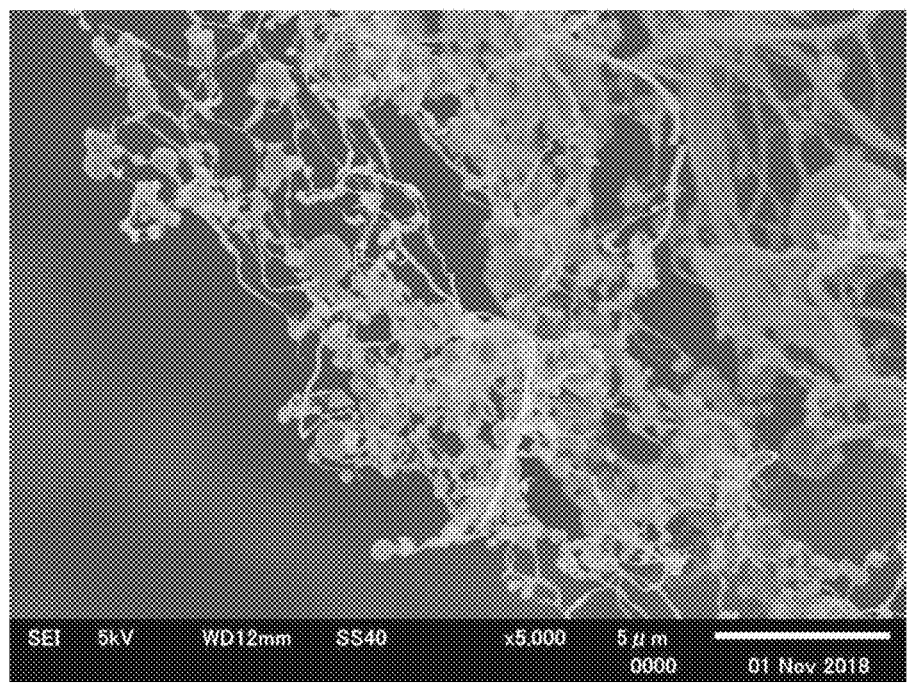
[Fig. 4]
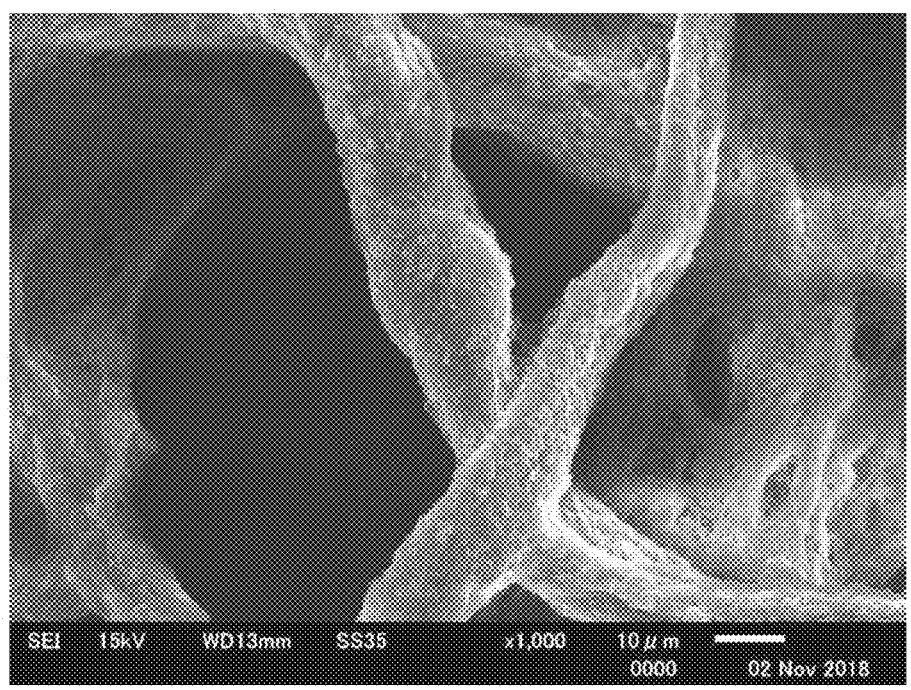

RUBBERY COMPOSITION AND METHOD FOR PRODUCING THE SAME

TECHNICAL FIELD

The present invention relates to a rubbery composition (or rubber composition) containing a rubber component and a cellulose coated with a compound having a 9,9-bisarylfluorene skeleton, and a method for producing the same.

BACKGROUND ART

Cellulose that is a plant-derived fiber is a sustainable resource with a low environmental load, and has excellent properties such as a high elastic modulus, a high strength, and a low coefficient of linear expansion. Thus, cellulose is used in a wide range of applications, for example, a material of a paper, a film or a sheet, and a composite material of a resin (e.g., a reinforcing agent of a resin). Cellulose is also added as a reinforcing agent to a rubber composition for the purpose of improving mechanical properties of a rubber.

Japanese Patent Application Laid-open Publication No. 2005-75856 (JP 2005-75856 A, Patent Document 1) discloses, as a rubber composition having both excellent low heat generation and rigidity, a tire rubber composition that contains 2 to 100 parts by weight of a finely powdered cellulose fiber being prepared from a natural plant fiber and having an average particle diameter of 100 μm relative to 100 parts by weight of a diene-series rubber. Japanese Patent Application Laid-open Publication No. 2005-133025 (JP 2005-133025 A, Patent Document 2) discloses, as a rubber composition having an excellent wear resistance, a rubber composition consisting of 5 to 75 parts by weight of a starch and 0.1 to 40 parts by weight of a bacterial cellulose having a fiber diameter of not more than 1 μm relative to 100 parts by weight of a diene-series rubber component.

Unfortunately, these rubber compositions have low properties such as fracture properties due to a low compatibility between the rubber and the cellulose.

In order to improve the compatibility between a rubber and a cellulose, Japanese Patent No. 4581116 (JP 4581116 B, Patent Document 3) discloses, as a vulcanized rubber composition having an excellent fracture properties and less energy loss in an interface between a rubber and a cellulose, a vulcanized rubber composition containing 1 to 50 parts by weight (more preferably 7 to 15 parts by weight) of a chemically modified microfibril cellulose relative to 100 parts by weight of a rubber component. The microfibril cellulose has an average fiber diameter of 4 nm to 1 μm, and the rubber component consists of at least one of a natural rubber, a modified natural rubber, an acrylonitrile butadiene rubber and a polybutadiene rubber. This document describes acetylation, alkylesterification, complex esterification, β-ketoesterification, and arylcarbamation as a method of chemically modifying a microfibril cellulose.

Unfortunately, this rubber composition also fails to improve its mechanical properties such as strength, elongation, and hardness probably due to a low affinity between the rubber and the chemically modified microfibril cellulose. The improvement in these properties uses a large amount of the chemically modified microfibril cellulose, and this makes it difficult to balance various properties.

CITATION LIST

Patent Literature

Patent Document 1: JP 2005-75856A (claim 1 and paragraph [0007])
Patent Document 2: JP 2005-133025 (Claims)
Patent Document 3: JP 4581116 B (Claims, paragraphs [0003] [0006] [0039])

SUMMARY OF INVENTION

Technical Problem

It is therefore an object of the present invention to provide a rubbery composition having improved mechanical properties such as strength, elongation and hardness, and a method for producing the composition.

Solution to Problem

The inventors of the present invention made intensive studies to achieve the above object and finally found that addition of a cellulose and a compound having a 9,9-bis (aryl)fluorene skeleton in combination to a rubber component allows the resulting rubbery composition to have improved mechanical properties such as strength, elongation, and hardness. The present invention was accomplished based on the above findings.

That is, the rubbery composition (or rubber composition) of the present invention contains (A) a rubber component, (B) a cellulose, and (C) a fluorene compound having a 9,9-bis(aryl)fluorene skeleton. The fluorene compound (C) may comprise (or may be) a compound represented by the following formula (1):

[Chem. 1]

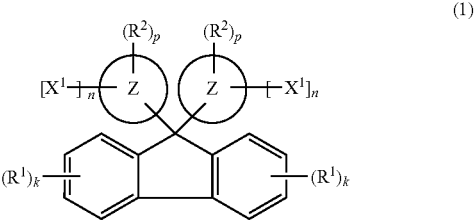

wherein a ring Z represents an arene ring, $R^1$ and $R^2$ represent a substituent, $X^1$ represents a heteroatom-containing functional group, k denotes an integer of 0 to 4, n denotes an integer of not less than 1, and p denotes an integer of not less than 0.

In the above-mentioned formula (1), $X^1$ may represent a group —$[(OA)_{m1}$-$Y^1]$, wherein A represents an alkylene group, $Y^1$ represents hydroxyl group or glycidyloxy group, and m1 denotes an integer of not less than 0. In particular, $Y^1$ may be hydroxyl group. The fluorene compound (C) may adhere to at least part of the surface of the cellulose (B). The cellulose (B) and the fluorene compound (C) are not covalently bonded (or a covalent bond is absent between the cellulose (B) and the fluorene compound (C)). The cellulose (B) may comprise (or may be) a cellulose nanofiber. The rubber component (A) may comprise (or may be) a vulcanizable or crosslinkable rubber and/or thermoplastic elastomer. The rubber component (A) may contain at least one member selected from the group consisting of a diene-series rubber and an olefinic rubber. The rubber component (A) may contain a styrenic thermoplastic elastomer. The ratio of the cellulose (B) is about 0.1 to 30 parts by mass relative to 100 parts by mass of the rubber component (A). The ratio of the fluorene compound (C) is about 1 to 100 parts by mass relative to 100 parts by mass of the cellulose (B).

The present invention also includes a method for producing the rubbery composition (or rubber composition), and the method includes mixing the rubber component (A), the cellulose (B), and the fluorene compound (C) having a 9,9-bis(aryl)fluorene skeleton. In the mixing, the cellulose (B) and the fluorene compound (C) having a 9,9-bis(aryl) fluorene skeleton may be premixed to prepare a premixture, and then the premixture and the rubber component (A) may be mixed. In a case where the rubber component (A) is a vulcanizable or crosslinkable rubber, the production method may further include vulcanizing an unvulcanized rubber composition, which is obtainable in the mixing, to give a vulcanized rubber composition.

The present invention also includes a shaped product formed of the rubbery composition (or rubber composition). The shaped product may be a hose member, a seal member, a tire, a belt, or an anti-vibration rubber.

Advantageous Effects of Invention

According to the present invention, the combination of the cellulose and the compound having a 9,9-bis(aryl)fluorene skeleton allows uniform dispersion of the cellulose in the rubber component and thus allows improvement in the mechanical properties of the rubbery composition (or rubber composition), including strength, elongation and hardness.

BRIEF DESCRIPTION OF DRAWINGS

FIG. 1 is a scanning electron microscope (SEM) photograph of a cellulose nanofiber used in Reference Example 2.
FIG. 2 is a scanning electron microscope (SEM) photograph of a cellulose nanofiber used in Reference Example 3.
FIG. 3 is a scanning electron microscope (SEM) photograph of a place sufficiently fibrillated in a composite of a BPEF and a cellulose nanofiber obtained in Example 2.
FIG. 4 is a scanning electron microscope (SEM) photograph of a place insufficiently fibrillated in a composite of a BPEF and a cellulose nanofiber obtained in Example 2.

DESCRIPTION OF EMBODIMENTS

The rubbery composition (or rubber composition) of the present invention contains (A) a rubber component, (B) a cellulose, and (C) a fluorene compound having a 9,9-bis (aryl)fluorene skeleton.
[Rubber Component (A)]

The rubber component (A) includes a vulcanizable or crosslinkable rubber and a thermoplastic elastomer. The rubber and the thermoplastic elastomer may be used alone or in combination.

The rubber is not particularly limited to a specific one, and there may be used a conventional rubber. Examples of the conventional rubber may include a diene-series rubber, an olefinic rubber, an acrylic rubber (ACM, ANM), a butyl rubber (IIR), an epichlorohydrin rubber (CO), a polysulfide rubber (OT, EOT), a urethane rubber (U), a silicone rubber (Q), a fluororubber (FFKM, FKM), and a sulfur-containing rubber. These rubbers may be used alone or in combination. Among these rubbers, the diene-series rubber and/or the olefinic rubber is preferred from the viewpoint of having a large effect of improving the dispersibility of the cellulose (B) by the fluorene compound (C).

The diene-series rubber may include, for example, a natural rubber (NR), an epoxidized natural rubber, a polybutadiene [e.g., a butadiene rubber (BR) and a 1,2-polybutadiene (VBR)], an isoprene rubber (IR), a chloroprene rubber (CR), an acrylonitrile-butadiene rubber (NBR), and a styrene-butadiene rubber (SBR). These diene-series rubbers may be a hydrogenated rubber (for example, a hydrogenated BR, a hydrogenated NBR, and a hydrogenated SBR). These diene-series rubbers may be used alone or in combination.

Examples of the olefinic rubber may include an ethylene-propylene rubber (EPM), an ethylene-propylene-diene rubber (EPDM), an ethylene-butene rubber, an ethylene-1-butene-diene rubber, a propylene-1-butene-diene rubber, a polyisobutylene rubber, an ethylene-vinyl acetate rubber, a maleic acid-modified ethylene-propylene rubber (M-EPM), a chlorosulfonated polyethylene (CSM), a chlorinated polyethylene (CM), and a maleic acid-modified chlorinated polyethylene (M-CM). A diene unit (non-conjugated diene unit) contained in the olefinic rubber may include, for example, units derived from dicyclopentadiene, 1,4-hexadiene, cyclooctadiene, methylenenorbornene, and ethylidenenorbornene. These olefinic rubbers may be used alone or in combination.

The copolymer rubber may be a random or block copolymer. The block copolymer may include, for example, a copolymer having an AB-type, an ABA-type, a tapered, or a radial teleblock structure.

Among them, the diene-series rubber such as SBR or NBR and the olefinic rubber such as EPDM are preferred.

The thermoplastic elastomer is a resin having a rubber-like property. The glass transition temperature of the thermoplastic elastomer may suitably be selected from a range of about −50° C. to 100° C. according to the applications of the composition and is, for example, about −20° C. to 80° C., preferably about 0 to 50° C. (e.g., about 5 to 40° C.), and more preferably about 10 to 30° C. (particularly about 15 to 25° C.). As used in this description and claims, the glass transition temperature can be measured by a conventional method using a differential scanning calorimetry.

The thermoplastic elastomer has a hardness of not more than 95° by a durometer hardness test (type A) in accordance with Japanese Industrial Standards (JIS) K6253, for example, about 50 to 90°, preferably about 60 to 85°, and more preferably about 65 to 80° (particularly about 70 to 78°). In a case where the hardness is excessively large, the composition may have low mechanical properties such as elongation.

The thermoplastic elastomer may have a melt flow rate (MFR) of not less than 0.5 g/10 minute by a method in accordance with JIS K7210 (190° C., 2.16 kgf), and the melt flow rate is, for example, about 0.5 to 20 g/10 minute, preferably about 1 to 10 g/10 minute, and more preferably about 1.5 to 5 g/10 minute (particularly about 2 to 3 g/10 minute). In a case where the MFR is excessively small, the mechanical properties of the composition or the dispersibility of the cellulose (B) in the composition may be low.

As a specifically used elastomer, there may be mentioned a conventional thermoplastic elastomer. The conventional thermoplastic elastomer may include, for example, an olefinic thermoplastic elastomer, a styrenic thermoplastic elastomer, a vinyl chloride-series thermoplastic elastomer, a polyester-series thermoplastic elastomer, a polyamide-series thermoplastic elastomer, a polyurethane-series thermoplastic elastomer, and a fluorine-containing thermoplastic elastomer. These thermoplastic elastomers may be used alone or in combination. Among these thermoplastic elastomers, the styrenic thermoplastic elastomer is preferred from the viewpoint of having a large effect of improving the dispersibility of the cellulose (B) by the fluorene compound (C).

The styrenic thermoplastic elastomer may be an elastomer that has a hard segment containing a styrenic unit and a soft segment containing a diene-series unit, for example, a styrene-diene-series block copolymer or a hydrogenated product thereof. The styrene-diene-series block copolymer or the hydrogenated product thereof may include a styrene-butadiene block copolymer, a hydrogenated styrene-butadiene block copolymer, a styrene-butadiene-styrene block copolymer (SBS), a hydrogenated styrene-butadiene-styrene block copolymer (SEBS), a styrene-isoprene block copolymer, a hydrogenated styrene-isoprene block copolymer (SEP), a styrene-isoprene-styrene block copolymer (SIS), and a hydrogenated styrene-isoprene-styrene block copolymer (SEPS). In the block copolymer, a terminal block may be either a styrene block or a diene block. Among them, the (hydrogenated) styrene-butadiene block copolymer such as SBS or SEBS is preferred.

[Cellulose (B)]

The cellulose (B) may include a pulp containing less or no noncellulosic component such as a lignin or a hemicellulose, for example, a pulp produced from a plant-derived cellulose material, an animal-derived cellulose material, or a bacteria-derived cellulose material, or other cellulose materials. Examples of the plant-derived cellulose material may include a wood [e.g., a coniferous tree (such as a pine, a fir, a spruce, a Japanese hemlock, or a Japanese cedar), a broad-leaved tree (such as a beech, a birch, a poplar, or a maple)], a herbaceous plant [such as a hemp plant (such as a hemp, a flax, a Manila hemp, or a ramie), a straw, a bagasse, or a mitsumata plant], a seed-hair fiber (such as a cotton linter, a bombax cotton, or a kapok), a bamboo, and a sugar cane. The animal-derived cellulose material may include, for example, a tunicate (or ascidian) cellulose. Examples of the bacteria-derived cellulose material may include a cellulose contained in nata de coco. These celluloses may be used alone or in combination. Among these celluloses, for example, a cellulose derived from a wood pulp (for example, a coniferous tree pulp and a broad-leaved tree pulp) and a cellulose derived from a seed-hair fiber (for example, a cotton linter pulp) are preferred. The pulp may be a mechanical pulp obtainable by mechanically treating a pulp material. In view of less or no noncellulosic component content, the pulp is preferably a chemical pulp obtainable by chemically treating a pulp material.

The cellulose (B) may be in a granular form or other forms and is practically in a fibrous (or fiber) form. In a case where the cellulose (B) is a fibrous cellulose (cellulose fiber), the cellulose (B) may have a fiber diameter of micron order. From the viewpoint of improving the mechanical properties of the rubbery composition, the cellulose (B) preferably has a nanometer-sized fiber diameter. The cellulose fiber may have an average fiber diameter of, for example, about 1 to 1000 nm (e.g., about 2 to 800 nm), preferably about 3 to 500 nm (e.g., about 5 to 300 nm), and more preferably about 10 to 200 nm (particularly about 15 to 100 nm). In a case where the average fiber diameter is excessively large, the rubbery composition may have low properties such as strength. The maximum fiber diameter of the cellulose fiber may be, for example, about 3 to 1000 nm (e.g., about 4 to 900 nm), preferably about 5 to 700 nm (e.g., about 10 to 500 nm), and more preferably about 15 to 400 nm (particularly about 20 to 300 nm). Such a nanometer-sized cellulose fiber is practically substantially free from a cellulose fiber having a micrometer-sized fiber diameter.

The average fiber length of the cellulose fiber may be selected from a range of, for example, about 0.01 to 500 µm (e.g., about 0.1 to 400 µm) and may practically be not less than 1 µm (e.g., about 5 to 300 µm), preferably not less than 10 µm (e.g., about 20 to 200 µm), and more preferably not less than 30 µM (particularly about 50 to 150 µm). In a case where the average fiber length is excessively short, the rubbery composition may have low mechanical properties. In contrast, in a case where the average fiber length is excessively long, the cellulose fiber in the rubbery composition may have a low dispersibility.

The ratio (aspect ratio) of the average fiber length relative to the average fiber diameter of the cellulose fiber may be, for example, not less than 5 (e.g., about 5 to 10000), preferably not less than 10 (e.g., about 10 to 5000), more preferably not less than 20 (e.g., about 20 to 3000), and particularly not less than 50 (e.g., about 50 to 2000), or may be not less than 100 (e.g., about 100 to 1000) and further not less than 200 (e.g., about 200 to 800). In a case where the aspect ratio is excessively small, the cellulose fiber may have a low reinforcing effect on the rubber component. In a case where the aspect ratio is excessively large, the cellulose fiber may be difficult to uniformly disperse and may easily be decomposed (or broken).

As used in this description and claims, the average fiber diameter, the average fiber length and the aspect ratio of the cellulose fiber may be calculated by randomly selecting and addition-averaging 50 fibers in an image of a scanning electron microscope photograph.

The cellulose nanofiber may be a nanofiber obtainable by a conventional method, for example, a physical method such as a high-pressure homogenizer method, an aqueous counter collision method, a grinder method, a ball mill method, or a twin-screw extrusion method or may be a nanofiber obtainable by a chemical method using a TEMPO catalyst, phosphoric acid, a dibasic acid, sulfuric acid, hydrochloric acid, or others.

The cellulose (B) may be a highly crystalline cellulose (or cellulose fiber). The cellulose (B) may have a degree of crystallinity of, for example, about 40 to 100% (e.g., about 50 to 100%), preferably about 60 to 100%, more preferably about 70 to 100% (particularly about 75 to 99%), and practically a degree of crystallinity of not less than 60% (e.g., about 60 to 98%). The crystalline structure of the cellulose (B) may include, for example, type I, type II, type III, and type IV. The crystalline structure I that has excellent linear expansion properties or elastic modulus is preferred. The degree of crystallinity can be measured by a powder X-ray diffractometer ("Ultima IV" manufactured by Rigaku Corporation) or others.

The cellulose (B) may contain a noncellulosic component such as a hemicellulose or a lignin. For the cellulose fiber (in particular, the cellulose nanofiber), the proportion of the noncellulosic component in the fibrous cellulose is not more than 30% by mass, preferably not more than 20% by mass, and more preferably not more than 10% by mass. The cellulose fiber may be a cellulose fiber substantially free from the noncellulosic component (in particular, a cellulose fiber free from the noncellulosic component).

The degree of polymerization of the cellulose (B) may be not less than 500 in light of the mechanical properties of the composition or may be preferably not less than 600 (e.g., about 600 to 100000). For the nanofiber, the viscosity-average degree of polymerization may be, for example, about 100 to 10000, preferably about 200 to 5000, and more preferably about 300 to 2000.

The viscosity-average degree of polymerization can be measured by a viscosity method described in TAPPI T230. That is, 0.04 mg of a modified cellulose nanofiber (or raw cellulose nanofiber) is weighed accurately, 10 mL of water and 10 mL of a 1M cupri-ethylenediamine aqueous solution are added thereto, and the mixture is stirred for about 5 minutes to dissolve the modified cellulose. The resulting solution is put in an Ubbelohde viscosimeter to measure a flow rate under 25° C. A mixture of 10 mL of water and 10 mL of a 1M cupri-ethylenediamine aqueous solution is measured as a blank. An intrinsic viscosity [η] is calculated based on these measurement values, and a viscosity-average degree of polymerization can be calculated from the intrinsic viscosity [η] in accordance with the following formula described in Experimental Manual for Wood Science (Mokushitsu Kagaku Jikken Manual) (edited by The Japan Wood Research Society, published by Buneido Shuppan):

Viscosity-average degree of polymerization=175×[η]

The ratio of the cellulose (B) (in particular, the cellulose fiber such as the cellulose nanofiber) relative to 100 parts by mass of the rubber component (A) may be selected from a range of about 0.1 to 30 parts by mass, and is, for example, about 0.2 to 25 parts by mass, preferably about 0.3 to 20 parts by mass, and more preferably about 0.5 to 15 parts by mass (particularly about 1 to 10 parts by mass). Further, according to the present invention, since the cellulose (B) (in particular, the cellulose fiber such as the cellulose nanofiber) can uniformly be dispersed by the after-mentioned fluorene compound (C), the composition can have improved mechanical properties or heat resistance even in a low ratio of the cellulose (B). The ratio of the cellulose (B) relative to 100 parts by mass of the rubber component (A) is, for example, about 0.1 to 10 parts by mass, preferably about 0.3 to 7 parts by mass, and more preferably about 0.5 to 5 parts by mass (particularly about 1 to 3 parts by mass). In a case where the ratio of the cellulose (B) is excessively low, the rubbery composition may have low mechanical properties. In contrast, in a case where the ratio is excessively high, the rubbery composition may have a low formability.

[Fluorene Compound (C)]

The fluorene compound (C) having an aryl group at 9,9-position thereof functions as a compatibilizer or dispersant for uniformly dispersing the cellulose (B) in the rubber component (A) and can greatly improve the mechanical properties of the rubbery composition by uniformly dispersing the cellulose (B) in the rubber component (A).

Such a fluorene compound is a compound having a 9,9-bisarylfluorene skeleton and may be, for example, a fluorene compound represented by the formula (1).

In the formula (1), the arene ring represented by the ring Z may include, for example, a monocyclic arene ring such as a benzene ring and a polycyclic arene ring. Examples of the polycyclic arene ring may include a condensed polycyclic arene ring (a condensed polycyclic hydrocarbon ring) and a ring-aggregated arene ring (a ring-aggregated aromatic hydrocarbon ring).

The condensed polycyclic arene ring may include, for example, a condensed bi- to tetra-cyclic arene ring such as a condensed bicyclic arene ring (e.g., a condensed bicyclic $C_{10-16}$arene ring such as a naphthalene ring) or a condensed tricyclic arene ring (e.g., an anthracene ring and a phenanthrene ring). Examples of a preferred condensed polycyclic arene ring includes the naphthalene ring and the anthracene ring. In particular, the naphthalene ring is preferred.

The ring-aggregated arene ring may include a biarene ring [for example, a bi$C_{6-12}$arene ring such as a biphenyl ring, a binaphthyl ring, or a phenylnaphthalene ring (e.g., 1-phenylnaphthalene ring and 2-phenylnaphthalene ring)] and a terarene ring (e.g., a ter$C_{6-12}$arene ring such as terphenylene ring). Examples of a preferred ring-aggregated arene ring includes a bi$C_{6-10}$arene ring, particularly the biphenyl ring.

Two rings Z as substituents at 9-position of the fluorene may be different from each other or may be the same rings. The rings are practically the same rings. Preferred as the rings Z are a benzene ring, a naphthalene ring, a biphenyl ring (in particular, a benzene ring), or others.

The substitution positions of the rings Z as substituents at 9-position of the fluorene are not limited to specific ones. For examples, in a case where the ring Z is a naphthalene ring, a group corresponding to the ring Z as a substituent at 9-position of the fluorene may be 1-naphthyl group, 2-naphthyl group, or others.

Examples of the heteroatom-containing functional group represented by $X^1$ may include a functional group having at least one member selected from oxygen, sulfur and nitrogen atoms as a heteroatom. The number of heteroatoms contained in such a functional group is not particularly limited to a specific one and may practically be 1 to 3, preferably 1 or 2.

The functional group may include, for example, a group —$[(OA)_{m1}$-$Y^1]$, wherein $Y^1$ is hydroxyl group, glycidyloxy group, amino group, N-substituted amino group, or mercapto group, A is an alkylene group, and m1 denotes an integer of not less than 0, and a group —$(CH_2)_{m2}$—$COOR^3$, wherein $R^3$ is hydrogen atom or an alkyl group, and m2 denotes an integer of not less than 0.

In the group —$[(OA)_{m1}$-$Y^1]$, the N-substituted amino group of $Y^1$ may include, for example, an N-monoalkylamino group such as methylamino or ethylamino group (e.g., an N-mono$C_{1-4}$alkylamino group) and an N-monohydroxyalkylamino group such as hydroxyethylamino group (e.g., an N-monohydroxy$C_{1-4}$alkylamino group).

The alkylene group A includes a straight-chain or branched-chain alkylene group. Examples of the straight-chain alkylene group may include a $C_{2-6}$alkylene group such as ethylene group, trimethylene group, or tetramethylene group (preferably a straight-chain $C_{2-4}$alkylene group, more preferably a straight-chain $C_{2-3}$alkylene group, particularly ethylene group). The branched-chain alkylene group may include, for example, a branched-chain $C_{3-6}$alkylene group such as propylene group, 1,2-butanediyl group, or 1,3-butanediyl group (preferably a branched-chain $C_{3-4}$alkylene group, particularly propylene group).

The number m1 that represents the repeating number (average added mole number) of oxyalkylene groups (OA) may be selected from a range of not less than 0 (for example, about 0 to 15, preferably about 0 to 10), and may be, for example, about 0 to 8 (e.g., about 1 to 8), preferably about 0 to 5 (e.g., about 1 to 5), more preferably about 0 to 4 (e.g., about 1 to 4), particularly about 0 to 3 (e.g., about 1 to 3) or may practically be about 0 to 2 (e.g., about 0 to 1). In a case where m1 is not less than 2, the species of the alkylene groups A may be the same or different from each other. The species of the alkylene groups A may be the same or different in the same or different rings Z.

In the group —$(CH_2)_{m2}$—$COOR^3$, examples of the alkyl group represented by $R^3$ may include a straight-chain or branched-chain $C_{1-6}$alkyl group such as methyl group, ethyl group, propyl group, isopropyl group, butyl group, or t-butyl group. A preferred alkyl group includes a $C_{1-4}$alkyl group, in particular a $C_{1-2}$alkyl group. The number m2 that represents the repeating number (average added mole number) of methylene groups may be 0 or an integer of not less than 1 (e.g., about 1 to 6, preferably about 1 to 4, more preferably about 1 to 2). The number m2 may practically be 0 or 1 to 2.

Among them, the group $X^1$ is preferably the group —[(OA)$_{m1}$-Y$^1$], wherein A is an alkylene group, $Y^1$ is hydroxyl group or glycidyloxy group, m1 denotes an integer of not less than 0. From the viewpoint of having a large effect of improving the dispersibility of the cellulose (B), the group in which $Y^1$ is hydroxyl group, that is, the group —[(OA)$_{m1}$-OH], wherein A is a $C_{2-6}$alkylene group such as ethylene group (e.g., a $C_{2-4}$alkylene group, particularly a $C_{2-3}$alkylene group) and m1 denotes an integer of 0 to 5 (e.g., 0 or 1), is particularly preferred.

In the formula (1), the number n that represents the number of groups $X^1$ bonded to the ring Z is not less than 1 and may be preferably 1 to 3, and more preferably 1 or 2 (particularly 1). The substitution numbers n may be the same or different in respective rings Z.

The group $X^1$ can be substituted at suitable position(s) of the ring Z. For example, in a case where the ring Z is a benzene ring, the substitution position is practically any of 2-, 3-, 4-positions (in particular, 3-position and/or 4-position, especially 4-position) of phenyl group. In a case where the ring Z is a naphthalene ring, the substitution position is practically any of 5- to 8-positions of naphthyl group. For example, the group $X^1$ and 9-position of the fluorene are practically bonded to the naphthalene ring at a relationship of 1,5-position or 2,6-position (in particular, when n is 1, at a relationship of 2,6-position), where 1-position or 2-position of the naphthalene ring is bonded to 9-position of the fluorene (the fluorene has 1-naphthyl or 2-naphthyl substituent). When n is not less than 2, the substitution position is not particularly limited to a specific one. In the ring-aggregated arene ring Z, the substitution position of the group $X^1$ is not particularly limited to a specific one. For example, an arene ring bonded to 9-position of the fluorene and/or an arene ring adjacent to the arene ring may be substituted by the group $X^1$. For example, 3-position or 4-position of the biphenyl ring may be bonded to 9-position of the fluorene. In a case where 3-position of the biphenyl ring Z is bonded to 9-position of the fluorene, the substitution position of the group $X^1$ may be any of 2-, 4-, 5-, 6-, 2'-, 3'-, 4'-positions or may preferably be 6-position.

In the formula (1), the substituent $R^2$ may include, for example, a halogen atom (for example, fluorine atom, chlorine atom, bromine atom, iodine atom), an alkyl group (e.g., a straight-chain or branched-chain $C_{1-10}$alkyl group such as methyl group, ethyl group, propyl group, isopropyl group, butyl group, s-butyl group, t-butyl group, preferably a straight-chain or branched-chain $C_{1-6}$alkyl group, more preferably a straight-chain or branched-chain $C_{1-4}$alkyl group), a cycloalkyl group (e.g., a $C_{5-10}$cycloalkyl group such as cyclopentyl group or cyclohexyl group), an aryl group [a $C_{6-12}$aryl group such as a phenyl group, an alkylphenyl group (e.g., methylphenyl (tolyl) group and dimethylphenyl (xylyl) group), a biphenyl group, or a naphthyl group], an aralkyl group (e.g., a $C_{6-10}$aryl-$C_{1-4}$alkyl group such as benzyl group or phenethyl group), an alkoxy group (e.g., a straight-chain or branched-chain $C_{1-10}$alkoxy group such as methoxy group, ethoxy group, propoxy group, n-butoxy group, isobutoxy group, or t-butoxy group), a cycloalkoxy group (e.g., a $C_{5-10}$cycloalkyloxy group such as cyclohexyloxy group), an aryloxy group (e.g., a $C_{6-10}$aryloxy group such as phenoxy group), an aralkyloxy group (e.g., a $C_{6-10}$aryl-$C_{1-4}$alkyloxy group such as benzyloxy group), an alkylthio group (e.g., a $C_{1-10}$alkylthio group such as methylthio group, ethylthio group, propylthio group, n-butylthio group, or t-butylthio group), a cycloalkylthio group (e.g., a $C_{5-10}$cycloalkylthio group such as cyclohexylthio group), an arylthio group (e.g., a $C_{6-10}$arylthio group such as thiophenoxy group), an aralkylthio group (e.g., a $C_{6-10}$aryl-$C_{1-4}$alkylthio group such as benzylthio group), an acyl group (e.g., a $C_{1-6}$acyl group such as acetyl group), a nitro group, and a cyano group.

Representative examples of these substituents $R^2$ may include the halogen atom, the hydrocarbon group (the alkyl group, the cycloalkyl group, the aryl group, the aralkyl group), the alkoxy group, the acyl group, the nitro group, the cyano group, and the substituted amino group. A preferred substituent $R^2$ includes the alkoxy group (e.g., a straight-chain or branched-chain $C_{1-4}$alkoxy group such as methoxy group), in particular, the alkyl group (particularly a straight-chain or branched-chain $C_{1-4}$alkyl group such as methyl group) is preferred. In a case where the substituent $R^2$ is the aryl group, the substituent $R^2$ may form the ring-aggregated arene ring together with the ring Z. The species of the substituents $R^2$ may be the same or different in the same or different rings Z.

The number p of the substituent $R^2$ may suitably be selected, for example, according to the species of the ring Z. For example, the number p may be an integer of about 0 to 8 or may be an integer of 0 to 4, preferably an integer of 0 to 3 (e.g., 0 to 2), and more preferably 0 or 1. In particular, when p is 1, the ring Z may be a benzene ring, a naphthalene ring or a biphenyl ring, and the substituent $R^2$ may be methyl group.

The substituent $R^1$ may include, for example, a cyano group, a halogen atom (e.g., fluorine atom, chlorine atom, and bromine atom), a carboxyl group, an alkoxycarbonyl group (for example, a $C_{1-4}$alkoxy-carbonyl group such as methoxycarbonyl group), an alkyl group (a $C_{1-6}$alkyl group such as methyl group, ethyl group, propyl group, isopropyl group, butyl group, or t-butyl group), and an aryl group (a $C_{6-10}$aryl group such as phenyl group).

Among these substituents $R^1$, preferred are a straight-chain or branched-chain $C_{1-4}$alkyl group (in particular, a $C_{1-3}$alkyl group such as methyl group), a carboxyl group or a $C_{1-2}$alkoxy-carbonyl group, a cyano group, and a halogen atom. The substitution number k is an integer of 0 to 4 (for example, 0 to 3), preferably an integer of 0 to 2 (for example, 0 or 1), particularly 0. Two substitution numbers k may be the same or different from each other. In a case where k is not less than 2, the species of the substituents $R^1$ may be the same or different from each other. The species of the substituent $R^1$ on one benzene ring of the fluorene ring may be the same as or different from that on the other benzene ring of the fluorene ring. The substitution position(s) of the substituent $R^1$ is not particularly limited to a specific one and may be, for example, any of 2-position to 7-position (e.g., 2-position, 3-position and/or 7-position) of the fluorene ring.

Among them, examples of a preferred fluorene compound include, when the group $X^1$ is the group —[(OA)$_{m1}$-Y$^1$], wherein $Y^1$ represents hydroxyl group, a 9,9-bis(hydroxy$C_{6-12}$aryl)fluorene such as 9,9-bis(4-hydroxyphenyl)fluorene, 9,9-bis(5-hydroxy-1-naphthyl)fluorene, or 9,9-bis(6-hydroxy-2-naphthyl)fluorene; a 9,9-bis(di- or trihydroxy$C_{6-12}$aryl)fluorene such as 9,9-bis(3,4-dihydroxyphenyl)fluorene; a 9,9-bis(mono- or di$C_{1-4}$alkyl-hydroxy$C_{6-12}$aryl)fluorene such as 9,9-bis(3-methyl-4-hydroxyphenyl)

fluorene; a 9,9-bis($C_{6-12}$aryl-hydroxy$C_{6-12}$aryl)fluorene such as 9,9-bis(3-phenyl-4-hydroxyphenyl)fluorene or 9,9-bis(4-phenyl-3-hydroxyphenyl)fluorene; a 9,9-bis(hydroxy(poly)$C_{2-4}$alkoxy-$C_{6-12}$aryl)fluorene such as 9,9-bis[4-(2-hydroxyethoxy)phenyl]fluorene or 9,9-bis[6-(2-hydroxyethoxy)-2-naphthyl]fluorene; a 9,9-bis($C_{1-4}$alkyl-hydroxy(poly)$C_{2-4}$alkoxy-$C_{6-12}$aryl)fluorene such as 9,9-bis[3-methyl-4-(2-hydroxyethoxy)phenyl]fluorene; and a 9,9-bis($C_{6-12}$aryl-hydroxy (poly) $C_{2-4}$alkoxy-$C_{6-12}$aryl) fluorene such as 9,9-bis[3-phenyl-4-(2-hydroxyethoxy)phenyl]fluorene or 9,9-bis[4-phenyl-3-(2-hydroxyethoxy)phenyl]fluorene.

Examples of a preferred fluorene compound when the group $X^1$ is the group —[$(OA)_{m1}$-$Y^1$], wherein $Y^1$ represents glycidyloxy group, includes a 9,9-bis(glycidyloxyaryl)fluorene, for example, a 9,9-bis(glycidyloxy$C_{6-10}$aryl)fluorene such as 9,9-bis(3-glycidyloxyphenyl)fluorene, 9,9-bis(4-glycidyloxyphenyl)fluorene, 9,9-bis(5-glycidyloxy-1-naphthyl)fluorene, or 9,9-bis(6-glycidyloxy-2-naphthyl)fluorene; a 9,9-bis(glycidyloxy(poly)alkoxyaryl)fluorene, for example, a 9,9-bis(glycidyloxy(poly)$C_{2-4}$alkoxy$C_{6-10}$aryl)fluorene such as 9,9-bis(4-(2-glycidyloxyethoxy)phenyl)fluorene, 9,9-bis(4-(2-glycidyloxypropoxy)phenyl)fluorene, 9,9-bis(5-(2-glycidyloxyethoxy)-1-naphthyl)fluorene, or 9,9-bis(6-(2-glycidyloxyethoxy)-2-naphthyl) fluorene; a 9,9-bis(alkyl-glycidyloxyaryl)fluorene, for example, a 9,9-bis(mono- or di$C_{1-4}$alkyl-glycidyloxy$C_{6-10}$aryl)fluorene such as 9,9-bis(3-methyl-4-glycidyloxyphenyl)fluorene; a 9,9-bis(alkyl-glycidyloxy(poly)alkoxyaryl)fluorene, for example, a 9,9-bis(mono- or di$C_{1-4}$alkyl-glycidyloxy (poly) $C_{2-4}$alkoxy$C_{6-10}$aryl)fluorene such as 9,9-bis(3-methyl-4-(2-glycidyloxyethoxy) phenyl) fluorene; a 9,9-bis (aryl-glycidyloxyaryl)fluorene, for example, a 9,9-bis($C_{6-10}$aryl-glycidyloxy$C_{6-10}$aryl)fluorene such as 9,9-bis(3-phenyl-4-glycidyloxyphenyl)fluorene; a 9,9-bis(aryl-glycidyloxy(poly)alkoxyaryl)fluorene, for example, a 9,9-bis($C_{6-10}$aryl-glycidyloxy(poly)$C_{2-4}$alkoxy$C_{6-10}$aryl)fluorene such as 9,9-bis(3-phenyl-4-(2-glycidyloxyethoxy)phenyl)fluorene; a 9,9-bis(di(glycidyloxy)aryl)fluorene, for example, a 9,9-bis(di(glycidyloxy) $C_{6-10}$aryl) fluorene such as 9,9-bis(3,4-di(glycidyloxy)phenyl)fluorene; and a 9,9-bis(di(glycidyloxy(poly)alkoxy)aryl)fluorene, for example, a 9,9-bis(di(glycidyloxy(poly)$C_{2-4}$alkoxy)$C_{6-10}$aryl)fluorene such as 9,9-bis(3,4-di(2-glycidyloxyethoxy)phenyl)fluorene.

These fluorene compounds (C) may be used alone or in combination. The term "(poly)alkoxy" is used as a meaning that includes both alkoxy group and polyalkoxy group.

The fluorene compound (C) may be present independently or separately from the cellulose (B) in the composition. From the viewpoint of improving the dispersibility of the cellulose (B), it is preferred that at least part of the fluorene compound (C) be present adjacent to or contact with the cellulose (B) in the composition, and it is particularly preferred that at least part of the fluorene compound (C) and the cellulose (B) form a composite. For the composite, the fluorene compound (C) adheres to the cellulose (B), and the form of the composite is not particularly limited to a specific one. The fluorene compound (C) may coat at least part of the surface of the cellulose (B), or the fluorene compound (C) may adhere in a granular form to the cellulose (B).

The cellulose (B) and the fluorene compound (C) may form a composite without modification (chemical modification) of the cellulose (B) with the fluorene compound (C). That is, in the present invention, the cellulose (B) and the fluorene compound (C) seem to not be bonded by a covalent bond such as an ether bond or an ester bond but be bonded relatively loosely by a hydrogen bond or other bonds or adhere to each other without bonding. Thus, the cellulose (B) (in particular, the nanofiber) has a high degree of freedom in the composition and can improve the mechanical properties (e.g., elongation) of the composition, and addition of a tensile stress such as stretching easily loosens the cellulose (B) and arranges the cellulose (B) toward the tensile direction. As used in this description and claims, the presence or absence of a covalent bond between the cellulose (B) and the fluorene compound (C) can easily be determined by a method of washing the composite with a solvent that can dissolve the fluorene compound (C) and quantifying the fluorene compound (C) in the washed liquid.

In a case where the fluorene compound (C) coats the surface of the cellulose (B), the average thickness of the coating layer formed of the fluorene compound (C) may be not less than 1 nm and is, for example, about 1 to 1000 nm, preferably about 5 to 800 nm, and more preferably about 10 to 500 nm. In a case where the thickness of the coating layer is excessively thin, the cellulose (B) in the composition may have a low dispersibility.

Since the composite of the fluorene compound (C) and the cellulose (B) is uniformly dispersed in the rubbery composition, the composition has excellent mechanical properties. The composite in the composition has a dispersion diameter of, for example, about 10 to 1000 nm, preferably about 10 to 500 nm, and more preferably about 10 to 200 nm.

The ratio of the fluorene compound (C) relative to 100 parts by mass of the cellulose (B) may be selected from a range of about 1 to 100 parts by mass and is, for example, about 10 to 90 parts by mass, preferably about 20 to 80 parts by mass, and more preferably about 30 to 70 parts by mass (particularly about 40 to 60 parts by mass). According to the present invention, since the ratio of the fluorene compound (C) is relatively high, the cellulose (B) can have a highly improved dispersibility and the cellulose (B) can be dispersed effectively and uniformly even in the form of a nanofiber. In a case where the ratio of the fluorene compound (C) is excessively low, the cellulose (B) in the composition may have a low dispersibility and the composition may have low mechanical properties. In contrast, in a case where the ratio of the fluorene compound (C) is excessively high, the composition may have low mechanical properties.

[Reinforcing Agent (D)]

The rubbery composition of the present invention [in particular, a vulcanized rubber composition in which the rubber component (A) is a rubber] may further contain (D) a reinforcing agent in addition to the rubber component (A), the cellulose (B) and the fluorene compound (C), in order to improve the mechanical properties such as hardness or strength.

As the reinforcing agent (D), there may be used a conventional reinforcing agent. Examples of the reinforcing agent may include a granular reinforcing agent (e.g., a carbonaceous material such as a carbon black or a graphite; a metal oxide such as calcium oxide, magnesium oxide, barium oxide, iron oxide, copper oxide, titanium oxide, or aluminum oxide (alumina); a metal silicate such as calcium silicate or aluminum silicate; a metal carbide such as silicon carbide or tungsten carbide; a metal nitride such as titanium nitride, aluminum nitride, or boron nitride; a metal carbonate such as magnesium carbonate or calcium carbonate; a metal sulfate such as calcium sulfate or barium sulfate; and a mineral substance material such as a zeolite, a diatomaceous earth, a baked diatomaceous earth, an activated clay, a silica, a talc, a mica, a kaolin, a sericite, a bentonite, a montmorillonite, a smectite, or a clay) and a fibrous reinforcing agent (e.g., an inorganic fiber such as a glass fiber, a carbon fiber, a boron fiber, a whisker, or a wollastonite; and an organic fiber such as a polyester fiber or a polyamide fiber). These reinforcing agents may be used alone or in combination.

Among these reinforcing agents, the granular reinforcing agent such as the carbon black or the silica (in particular, a granular inorganic reinforcing agent) is widely used. The carbon black is preferred from the viewpoint of greatly improving the mechanical properties of the rubbery composition by combination with the fluorene compound (C). According to the present invention, the fluorene compound (C) improves not only the dispersibility of the cellulose (B) in the rubber component but also the dispersibility of the granular reinforcing agent due to a high compatibility with the granular reinforcing agent (in particular, the carbon black).

The carbon black may include, for example, an acetylene black, a lamp black, a thermal black, a furnace black, a channel black, a Ketjen black, coated carbon black, and a grafted carbon black. These carbon blacks may be used alone or in combination.

The average particle diameter (arithmetic average particle diameter) of the carbon black may be selected from a range of about 5 to 200 nm and is, for example, about 10 to 150 nm, preferably about 15 to 100 nm, and more preferably about 20 to 80 nm (particularly about 30 to 50 nm). In a case where the average particle diameter of the carbon black is excessively small, it may be difficult to uniformly disperse the carbon black. In a case where the average particle diameter of the carbon black is excessively large, the vulcanized rubber composition may have low mechanical properties.

The ratio of the reinforcing agent (D) relative to 100 parts by mass of the rubber component (A) may be selected from a range of about 3 to 300 parts by mass and is, for example, about 5 to 200 parts by mass, preferably about 8 to 150 parts by mass, and more preferably about 10 to 100 parts by mass (particularly about 15 to 80 parts by mass). In a case where the ratio of the reinforcing agent is excessively low, the effect that improves the mechanical properties of the rubbery composition may be lowered. In constant, in a case where the ratio of the reinforcing agent is excessively high, the vulcanized rubber composition may have low properties such as elongation or strength.

[Softener (E)]

The rubbery composition of the present invention [in particular, the vulcanized rubber composition in which the rubber component (A) is a rubber] may further contain (E) a softener in addition to the rubber component (A), the cellulose (B) and the fluorene compound (C), in order to improve the dispersibility of the cellulose (B) in the composition or the formability of the composition.

The softener (E) may include oils as a softener that has a compatibility with the rubber component (A) to reduce the viscosity of the rubbery composition (in particular, an unvulcanized rubber composition). The oils may include, for example, a paraffinic oil, a naphthenic oil, and a process oil. These softeners may be used alone or in combination. Among these softeners, the oils such as the paraffinic oil or the naphthenic oil are preferred.

According to the present invention, even in a case where the softener (E) is added in order to improve the formability, the fluorene compound (C) contained in the rubbery composition can prevent the lowering of the mechanical properties of the rubbery composition (in particular, a vulcanized rubber composition containing an olefinic rubber such as EPDM) due to the softener (E).

The ratio of the softener (E) may suitably be selected according to the species of the rubber component (A). The ratio of the softener (E) relative to 100 parts by mass of the rubber component (A) may be selected from a range of about 0.1 to 500 parts by mass and is, for example, about 0.5 to 400 parts by mass (e.g., about 1 to 300 parts by mass), preferably about 1 to 200 parts by mass, and more preferably about 3 to 100 parts by mass. In a case where the rubber component (A) is an olefinic rubber, the ratio of the softener (E) relative to 100 parts by mass of the rubber component (A) may be, for example, about 10 to 200 parts by mass, preferably about 20 to 150 parts by mass, and more preferably about 30 to 100 parts by mass (particularly about 40 to 60 parts by mass). In a case where the ratio of the softener (E) is excessively low, the effect of improving the dispersibility of the cellulose (B) by the fluorene compound (C) may be lowered. In contrast, in a case where the ratio of the softener (E) is excessively high, the rubbery composition may have low mechanical properties.

[Plasticizer (F)]

The rubbery composition of the present invention [in particular, the vulcanized rubber composition in which the rubber component (A) is a rubber] may further contain (F) a plasticizer in addition to the rubber component (A), the cellulose (B) and the fluorene compound (C), in order to improve the formability or others. The plasticizer (F) may include, for example, stearic acid, a metal stearate, a wax, a paraffin, and a fatty acid amide. These plasticizers may be used alone or in combination. Among them, a higher fatty acid such as stearic acid is preferred. The ratio of the plasticizer (F) relative to 100 parts by mass of the rubber component (A) is, for example, about 0.1 to 10 parts by mass, preferably about 0.5 to 5 parts by mass, and more preferably about 1 to 3 parts by mass. In a case where the ratio of the plasticizer (F) is excessively low, the effect that improves the formability of the rubbery composition may be lowered. In constant, in a case where the ratio of the plasticizer (F) is excessively high, the rubbery composition may have low mechanical properties.

[Vulcanizing Agent (G)]

The rubbery composition of the present invention practically contains (G) a vulcanizing agent in a case where the rubber component (A) is a rubber. As the vulcanizing agent (G), there may be used a conventional vulcanizing agent according to the species of the rubber. The vulcanizing agent (G) may include a sulfur-containing vulcanizing agent and an organic peroxide.

The sulfur-containing vulcanizing agent may include, for example, a powdered sulfur, a precipitated sulfur, a colloidal sulfur, an insoluble sulfur, a highly dispersed sulfur, a surface-treated sulfur, a sulfur chloride (such as sulfur monochloride or sulfur dichloride), morpholine disulfide, and an alkylphenol disulfide.

Examples of the organic peroxide may include a diacyl peroxide such as dilauroyl peroxide, dibenzoyl peroxide, or 2,4-dichlorobenzoyl peroxide; a dialkyl peroxide such as di-t-butyl peroxide, t-butylcumyl peroxide, dicumyl peroxide, 1,1-di-butylperoxy-3,3,5-trimethylcyclohexane, 2,5-dimethyl-2,5-di(t-butylperoxy)-hexane, or 1,3-bis(t-butylperoxy-isopropyl)benzene; a hydroperoxide such as t-butyl hydroperoxide, cumene hydroperoxide, or diisopropylbenzene hydroperoxide; and a peroxy ester such as n-butyl-4,4-di-t-butylperoxyvalerate or 2,5-dimethylhexane-2,5-di(peroxybenzoate).

These vulcanizing agents may be used alone or in combination. Among them, the sulfur or the dialkyl peroxide such as dicumyl peroxide is widely used.

The ratio of the vulcanizing agent (G) relative to 100 parts by mass of the rubber may be selected from a range of about 0.1 to 30 parts by mass. For the sulfur-containing vulcanizing agent, the ratio is, for example, about 0.1 to 10 parts by mass, preferably about 0.5 to 8 parts by mass, and more preferably about 0.6 to 5 parts by mass. For the organic peroxide, the ratio is, for example, about 1 to 25 parts by mass, preferably about 3 to 20 parts by mass, and more preferably about 5 to 15 parts by mass.

[Vulcanization Auxiliary (H)]

The rubbery composition of the present invention may further contain (H) a vulcanization auxiliary in order to accelerate vulcanization in a case where the rubber component (A) is a rubber. The vulcanization auxiliary (or co-crosslinking agent) (H) may include, for example, an organic vulcanization accelerator [e.g., a sulfenamide-series accelerator such as N-cyclohexyl-2-benzothiazyl sulfenamide (CBS) or N-t-butyl-2-benzothiazyl sulfenamide (TBBS); a thiuram-series accelerator such as tetramethylthiuram monosulfide (TMTM) or tetramethylthiuram disulfide (TMTD); a thiazole-series accelerator such as 2-mercaptobenzothiazole (MBT), a zinc salt of MBT, or dibenzothiazyl disulfide (MBTS); a thiourea-series accelerator such as trimethylthiourea (TMU) or diethylthiourea (EDE); a guanidine-series accelerator such as diphenylguanidine (DPG) or di-o-tolylguanidine (DOTG); a carbamic acid-series accelerator such as sodium dimethyldithiocarbamate; a xanthate-series accelerator such as zinc isopropylxanthate; and an aldehyde-amine-series or aldehyde-ammonia-series accelerator such as hexamethylenetetramine], a polyfunctional (iso)cyanurate [e.g., triallyl isocyanurate (TAIC) and triallyl cyanurate (TAC)], a polydiene (e.g., 1,2-polybutadiene), a metal salt of an unsaturated carboxylic acid [e.g., a polyvalent metal salt of (meth)acrylic acid such as zinc (meth)acrylate], a polyfunctional (meth)acrylate [e.g., an alkanediol di(meth)acrylate such as ethylene glycol di(meth)acrylate, and an alkanepolyol poly(meth)acrylate such as pentaerythritol tetra(meth)acrylate], an aromatic maleimide (an arene bismaleimide such as N,N'-m-phenylenedimaleimide), and an inorganic auxiliary [such as zinc oxide (zinc white) or magnesium oxide].

These vulcanization auxiliaries may be used alone or in combination. Among them, the sulfenamide-series accelerator such as CBS, the thiuram-series accelerator such as TMTD, and the inorganic auxiliary such as zinc oxide are widely used.

The ratio of the vulcanization auxiliary (H) relative 100 parts by mass of the rubber may be, for example, about 4 to 30 parts by mass, preferably about 5 to 25 parts by mass, and more preferably about 10 to 20 parts by mass. The ratio of the organic vulcanization accelerator relative to 100 parts by mass of the rubber may be, for example, about 1 to 10 parts by mass, preferably about 3 to 8 parts by mass, and more preferably about 5 to 7 parts by mass. The ratio of the inorganic auxiliary (in particular, zinc white) relative to 100 parts by mass of the rubber may be, for example, about 3 to 20 parts by mass, preferably about 5 to 15 parts by mass, and more preferably about 7 to 10 parts by mass.

[Other Additives (I)]

The rubbery composition of the present invention may contain a conventional additive according to the species of the rubber component (A). The conventional additive may include, for example, a resin component (such as a thermoplastic resin or a thermosetting resin), a solvent, a vulcanization retarder, a dispersant, an anti-aging agent or antioxidant (such as an aromatic amine-series or benzimidazole-series anti-aging agent), a coloring agent (e.g., a dye or a pigment), a tackifier, a coupling agent (such as a silane coupling agent), a stabilizer (such as an ultraviolet absorbing agent, a light stabilizer, or a heat stabilizer), a releasing agent, a lubricant, a flame retardant (such as a phosphorus-containing flame retardant, a halogen-containing flame retardant, or an inorganic flame retardant), a damping agent, a flame-retardant auxiliary, an antistatic agent, a conductive agent, a flow control agent, a leveling agent, a defoaming agent, a surface modifier, a stress reducing agent, a nucleating agent, a crystallization accelerator, an antimicrobial agent, and a preservative.

These other additives may be used alone or in combination. The ratio of these other additives relative to 100 parts by mass of the rubber component (A) may be, for example, about 0.1 to 50 parts by mass, preferably about 0.5 to 30 parts by mass, and more preferably about 1 to 10 parts by mass.

[Method for Producing Rubbery Composition]

The rubbery composition of the present invention is obtainable through mixing (a step of mixing) the rubber component (A), the cellulose (B), and the fluorene compound (C) having an aryl group at 9,9-position.

In the mixing mentioned above, the rubber component (A), the cellulose (B), and the fluorene compound (C) may be added together and mixed at the same time. From the viewpoint of accelerating the formation of a composite in which the surface of the cellulose (B) is coated with the fluorene compound (C) in the composition and improving the dispersibility of the cellulose (B) (in particular, the nanofiber) in the composition, it is preferred that the cellulose (B) and the fluorene compound (C) be premixed to prepare a premixture before the rubber component (A) is mixed. Probably because the premixing allows an efficient formation of a composite in which at least part of the surface of the cellulose (B) is coated with the fluorene compound (C) before the rubber component (A) is mixed, the proportion of the composite can be increased even in a composition in which the rubber component is mixed.

The premixture may contain only the composition in which at least part of the surface of the cellulose (B) is coated with this fluorene compound (C) or may be a mixture of this composite with the cellulose (B) and/or the fluorene compound (C). The proportion of the composite in the premixture is, for example, not less than 50% by mass, preferably not less than 80% by mass, and more preferably not less than 90% by mass.

In the premixing, when the cellulose (B) is a nanofiber, drying of the cellulose nanofiber (in particular, a microfibrillated fiber, a nanofiber having a nanometer-sized average fiber diameter) may cause entanglement of the fiber and non-redispersion due to the entanglement. Thus, it is practically preferred that the cellulose (B) (in particular, the cellulose nanofiber) be premixed with the fluorene compound (C), in the state of a mixture with water, for example, in the state of a water-impregnation material (water-wet material) or a water dispersion. The mixture of the cellulose nanofiber and water may be a commercially available product.

The cellulose concentration in the mixture of the cellulose (B) and water (in particular, the solid content concentration of the cellulose nanofiber) is, for example, about 1 to 80% by mass, preferably about 3 to 50% by mass, and more preferably about 5 to 30% by mass (particularly about 10 to 25% by mass). In a case where the solid content concentration is excessively low, the mixture may result in an inefficient formation of the composite. In contrast, in a case where the solid content concentration is excessively high, the mixture may have a low handleability.

The premixing of the mixture of the cellulose (B) and water with the fluorene compound (C) may be carried out in the absence of a solvent. From the viewpoint of efficiently forming the composite of the cellulose (B) and the fluorene compound (C), it is preferred that the premixing be carried out in the presence of a solvent.

As the solvent, preferred is an amphipathic solvent having an affinity for both of water and the fluorene compound. The amphipathic solvent may include, for example, an alcohol compound (such as butanol, cyclohexanol, or 1-methoxy-2-propanol), an cellosolve compound or carbitol compound (such as ethylene glycol dimethyl ether, diethylene glycol dimethyl ether, propylene glycol monomethyl ether acetate, dipropylene glycol dimethyl ether, or a polyethylene glycol dimethyl ether), a ketone compound (such as acetone, methyl ethyl ketone, methyl isobutyl ketone, or cyclohexanone), an ether compound (such as dioxane or tetrahydrofuran), a lactone (such as butyrolactone or caprolactone), an ester compound (such as methyl acetate, ethyl acetate, or butyl acetate), a lactam (such as butyrolactam or caprolactam), an amide compound (such as dimethylformamide or dimethylacetamide), and a sulfoxide compound (such as dimethyl sulfoxide). These solvents may be used alone or in combination. Among them, in light of easy distillation away of the solvent, examples of a widely used solvent may include a cellosolve compound or carbitol compound having both ends each etherified with an alkyl group, the ketone compound, the lactone compound, the lactam compound, the amide compound, and the sulfoxide compound. Examples of a preferably used solvent includes an alicyclic ketone compound such as cyclohexanone, and a cellosolve compound such as diethylene glycol dimethyl ether. Such an amphipathic solvent is easily distilled away and in addition, is hard to remain in the composition even when the composite is mixed with the rubber component (A) in a state containing the solvent.

The ratio of the solvent relative to 100 parts by mass of the total amount of the fluorene compound (C) and the mixture of the cellulose (B) and water may be not less than 100 parts by mass and is, for example, about 100 to 10000 parts by mass, preferably about 300 to 5000 parts by mass, and more preferably about 500 to 3000 parts by mass (particularly about 1000 to 2000 parts by mass).

The mixing method in the premixing may be a melt kneading, or may be a stirring with a magnetic stirrer or impeller widely used in chemical reactions. For the stirring, a larger rotational speed of the stirring is preferred. For example, the stirring may be carried out at a rotational speed of not less than 10 rpm (e.g., about 10 to 10000 rpm), preferably not less than 50 rpm (e.g., about 50 to 7000 rpm), more preferably not less than 100 rpm (e.g., about 100 to 5000 rpm), and particularly not less than 200 rpm (e.g., about 200 to 3000 rpm).

In a case where the nanofiber is used as the cellulose (B), the cellulose (B) may be a commercially available nanofiber or may be a nanofiber obtainable by fibrillating a cellulose. In the fibrillation of the cellulose, the fluorene compound (C) and the solvent may be added to the cellulose before the fibrillation.

A dispersion containing the cellulose (B) and the fluorene compound (C) is preferably prepared as an impregnation material of water and the solvent by distilling a large proportion of water and the solvent away through a drying treatment, in order to mix with the rubber component (A). As the method of distilling water and the solvent away, there may be used a conventional method, for example, a method of heating and/or depressurizing. From the viewpoint of productivity, a method of heating and depressurizing is preferred.

For the heating method, there may be used a conventional means, for example, a stationary hot-air dryer, a vacuum dryer, a rotary evaporator, and a mixing dryer (such as a conical dryer or a Nauta dryer). The heating temperature is, for example, about 40 to 200° C., preferably about 60 to 150° C., and more preferably about 70 to 100° C.

For the depressurizing method, there may be used a conventional means, for example, an oil pump, an oilless pump, and an aspirator. The pressure in the depressurizing method is, for example, about 0.00001 to 0.05 MPa and preferably 0.00001 to 0.03 MPa.

The composite of the cellulose (B) and the fluorene compound (C) obtained by the drying treatment may contain water and the solvent in a predetermined amount from the viewpoint of uniformly dispersing the cellulose (B) in the rubber component (A). The total ratio of water and the solvent relative to 100 parts by mass of the total amount of the cellulose (B) and the fluorene compound (C) after the drying treatment is about 10 to 2000 parts by mass, preferably about 50 to 1000 parts by mass, and more preferably about 100 to 500 parts by mass (particularly about 150 to 400 parts by mass). Moreover, the composite may contain the solvent alone, for example, from the viewpoint of improving the kneadability of the composite. The ratio of the solvent relative to 100 parts by mass of the total amount of the cellulose (B) and the fluorene compound (C) after the drying treatment is about 10 to 1000 parts by mass, preferably about 20 to 700 parts by mass, and more preferably about 30 to 500 parts by mass.

In the mixing, a method of mixing the composite of the cellulose (B) and the fluorene compound (C) obtained in the premixing (or premixing step) with the rubber component (A) may suitably be selected according to the species of the rubber component (A).

In a case where the rubber component (A) is a rubber, it is preferred that, before the rubber is mixed with the composite, the rubber and an additive such as a vulcanizing agent be kneaded by a conventional means, for example, a mixing roller, a kneader, a Banbury mixer, and an extruder (such as a single-screw or twin-screw extruder), to prepare a composition for mixing the composite. Among them, a kneader such as a pressure kneader is preferred. To the composition that has been kneaded by such a means may be added and kneaded the composite with a roll. The kneading may be carried out under either an unheated or heated condition. For the heated condition, the kneading temperature is, for example, about 30 to 250° C., preferably about 40 to 200° C., and more preferably about 50 to 180° C. (particularly about 80 to 160° C.).

In a case where the rubber component (A) is a rubber, the vulcanized rubber composition is obtainable through vulcanizing (a step of vulcanizing) an unvulcanized rubber composition obtained in the above-mentioned mixing in a state that the unvulcanized rubber composition is formed into a predetermined form. In the vulcanizing, the vulcanization temperature may be selected according to the species of the rubber and is, for example, about 100 to 250° C., preferably about 150 to 200° C., and more preferably about 160 to 190° C.

In a case where the rubber component (A) is a thermoplastic elastomer, the thermoplastic elastomer and the composite may be melt-kneaded by a conventional means, for example, a mixing roller, a kneader, a Banbury mixer, and an extruder (such as a single-screw or twin-screw extruder), to prepare a rubbery composition or may be formed by a conventional forming (or molding) method such as an injection molding. Among them, the extruder such as the twin-screw extruder is preferred. The kneading temperature is, for example, about 60 to 270° C., preferably about 80 to 250° C., and more preferably about 100 to 230° C.

EXAMPLES

The following examples are intended to describe this invention in further detail and should by no means be interpreted as defining the scope of the invention. Used raw materials and evaluation methods are as follows.
(Used Raw Material)
BPEF: 9,9-bis[4-(2-hydroxyethoxy)phenyl]fluorene, manufactured by Osaka Gas Chemicals Co., Ltd.
BCF: 9,9-bis(4-hydroxy-3-methylphenyl)fluorene, manufactured by Osaka Gas Chemicals Co., Ltd.
BPFG: 9,9-bis(4-glycidyloxyphenyl)fluorene, manufactured by Osaka Gas Chemicals Co., Ltd.
EPDM: "JSR EP21" manufactured by manufactured by JSR Corporation
SBR: "JSR 1502" manufactured by JSR Corporation
SBS: "TUFPRENE A" manufactured by Asahi Kasei Corp. (former name: Asahi Kasei Chemicals Corp.)
Bisphenol A type epoxy resin: "jER 828" manufactured by Mitsubishi Chemical Corporation
CB HAF: "SEAST 3" manufactured by TOKAI CARBON CO., LTD.
CB N234: "SEAST 7HM" manufactured by TOKAI CARBON CO., LTD.
Naphthenic oil: "Diana Process NS-100" manufactured by Idemitsu Kosan Co., Ltd.
Process oil: "Vivatec 500 (TDAE)" manufactured by H&R
Zinc white: "Zinc White No. 1" manufactured by MITSUI MINING & SMELTING CO., LTD.
Stearic acid: "STEARIC ACID CAMELLIA" manufactured by NOF CORPORATION
Sulfur: "Powdered Sulfur" manufactured by Tsurumi Chemical Industry Co., ltd.
Accelerator TT: "NOCCELER TT-P" manufactured by OUCHI SHINKO CHEMICAL INDUSTRIAL CO., LTD.
Accelerator M: "NOCCELER M-P" manufactured by OUCHI SHINKO CHEMICAL INDUSTRIAL CO., LTD.
Accelerator CBS: "NOCCELER CZ-G" manufactured by OUCHI SHINKO CHEMICAL INDUSTRIAL CO., LTD.
(Tensile Test)
In accordance with JIS K6251, 25 to 300% tensile stress, tensile strength, and elongation were measured.
(Durometer Hardness)
In accordance with JIS K6253 type A, durometer hardness was measured.
(Density)
In accordance with JIS K6268, density was measured.

Reference Example 1 (EPDM/Blank)

Components each having a proportion shown in Table 1 were kneaded at a temperature of 150° C. using a pressure kneader (manufactured by Moriyama Company Ltd., capacity: 10 liters) to prepare an unvulcanized rubber composition. The resulting composition was press-vulcanized at a vulcanization temperature of 170° C. to give a vulcanized rubber composition.

[Table 1]

TABLE 1

| Components | Proportion (parts by mass) |
|---|---|
| EPDM | 100 |
| CB HAF | 80 |
| Naphthenic oil | 50 |
| Zinc white | 5 |
| Stearic acid | 1 |
| Sulfur | 1.5 |
| Accelerator TT | 1 |
| Accelerator M | 0.5 |
| Total | 239 |

Reference Example 2 (EPDM/B-CNF)

(Synthesis of Modified Cellulose Nanofiber)
After 100 g of a water dispersion of a cellulose nanofiber (solid content concentration: 15% by mass) was dispersed in 500 g of N,N-dimethylacetamide (DMAc) and the resulting dispersion was centrifuged, the precipitated solid content was dispersed in another 500 g of DMAc and the resulting dispersion was then re-centrifuged for solvent replacement to give a mixture of the cellulose nanofiber and DMAc (cellulose content: about 10% by mass). This mixture was transferred into a 1000-mL three-necked flask, and another 350 g of DMAc, 15 g of 9,9-bis(4-glycidyloxyphenyl) fluorene (BPFG), and 10 g of diazabicycloundecene (DBU) were added thereto. The mixture was stirred at 120° C. for 3 hours. The resulting mixture was centrifuged to collect a precipitated product, and washing of the precipitated product with 1200 mL of DMAc was repeated three times to give a modified cellulose nanofiber (B-CNF). The percentage of modification with the fluorene compound was 12% by mass when measured by the following method. Incidentally, FIG. 1 is a scanning electron microscope (SEM) photograph of the used raw cellulose nanofiber observed with an SEM ("JSM-6510" manufactured by JEOL Ltd.).
(Percentage of Fluorene Compound in Modified Cellulose Nanofiber)
The percentage of modification with the fluorene compound (hereinafter, may be referred to as a percentage of the fluorene modification) was calculated from a strength ratio (11604/11375) of an absorption band of CH constituting an aromatic ring (1604 cm$^{-1}$) relative to that of CH constituting a ring structure of a cellulose (1375 cm$^{-1}$) by a Raman analysis using a Raman microscope (XploRA, manufactured by HORIBA JOBIN YVON S.A.S.). For the calculation, a calibration curve created as follows was used. The fluorene compound was added at different proportions to a diacetylcellulose (manufactured by Daicel Corporation) to give mixtures with different concentrations, each mixture was subjected to solution casting to produce a film, and a calibration curve was created from the strength ratios ($I_{1604}/I_{1375}$) in the resulting films. All samples were measured three times, and the average of values calculated from the results was given as a percentage of the fluorene modification.
(Preparation of Vulcanized Rubber Composition)
Using a 6-inch roll, 3 parts by mass of the modified cellulose nanofiber (B-CNF) were added in terms of a solid content to 100 parts by mass of the unvulcanized rubber composition obtained in Reference Example 1 to prepare an unvulcanized rubber composition containing the modified cellulose nanofiber. A vulcanized rubber composition was obtained from the unvulcanized rubber composition in the same method as Reference Example 1.

Reference Example 3 (EPDM/Epoxy Resin-CNF Composite)

(Preparation of Composite of Bisphenol A Type Epoxy Resin and Cellulose Nanofiber)

A water-wet material was provided which contained a plant-derived cellulose nanofiber containing not less than 50% by mass of a fiber having a diameter of not more than 100 nm fibrillated by a grinder method. To 150 g of the water-wet material (solid content: 20% by mass, containing 30 g of the cellulose nanofiber) were added 1800 g of cyclohexanone and 15 g of bisphenol A type epoxy resin (50 parts by mass of the epoxy resin relative to 100 parts by mass of the cellulose nanofiber), and the mixture was stirred at 600 rpm for 10 minutes using a stirrer ("Three-One Motor" manufactured by Shinto Scientific Co., Ltd.). Then, the mixture was depressurized at 80° C. using a rotary evaporator to give 150 g of a wet epoxy resin-CNF composite. Incidentally, FIG. 2 is an SEM photograph of the used raw cellulose nanofiber. The cellulose nanofiber was a continuous fiber (long fiber) having an average fiber diameter of 114 nm.

(Preparation of Vulcanized Rubber Composition)

Using a 6-inch roll, 3 parts by mass of the epoxy resin-CNF composite were added in terms of a solid content to 100 parts by mass of the unvulcanized rubber composition obtained in Reference Example 1 to prepare an unvulcanized rubber composition containing the epoxy resin-CNF composite. A vulcanized rubber composition was obtained from the unvulcanized rubber composition in the same method as Reference Example 1.

Example 1 (EPDM/BPFG-CNF Composite)

(Preparation of Composite of BPFG and Cellulose Nanofiber)

A BPFG-CNF composite (50 parts by mass of BPFG relative to 100 parts by mass of the cellulose nanofiber) was obtained in the same manner as Reference Example 3 except that BPFG was used instead of the bisphenol A type epoxy resin.

(Preparation of Vulcanized Rubber Composition)

Using a 6-inch roll, 3 parts by mass of the BPFG-CNF composite were added in terms of a solid content to 100 parts by mass of the unvulcanized rubber composition obtained in Reference Example 1 to prepare an unvulcanized rubber composition containing the BPFG-CNF composite. A vulcanized rubber composition was obtained from the unvulcanized rubber composition in the same method as Reference Example 1.

Example 2 (EPDM/BPEF-CNF Composite)

(Preparation of Composite of BPEF and Cellulose Nanofiber)

A BPEF-CNF composite (50 parts by mass of BPEF relative to 100 parts by mass of the cellulose nanofiber) was obtained in the same manner as Reference Example 3 except that BPEF was used instead of the bisphenol A type epoxy resin. The composite was observed by SEM. As shown in FIG. 3, granular BPEF adhered to the surface of the cellulose nanofiber in a place sufficiently fibrillated in the composite, and as shown in FIG. 4, the cellulose fiber in a place insufficiently fibrillated had a surface coated with BPEF.

(Preparation of Vulcanized Rubber Composition)

Using a 6-inch roll, 3 parts by mass of the BPEF-CNF composite were added in terms of a solid content to 100 parts by mass of the unvulcanized rubber composition obtained in Reference Example 1 to prepare an unvulcanized rubber composition containing the BPEF-CNF composite. A vulcanized rubber composition was obtained from the unvulcanized rubber composition in the same method as Reference Example 1.

Example 3 (EPDM/BCF-CNF Composite)

(Preparation of Composite of BCF and Cellulose Nanofiber)

A BCF-CNF composite (50 parts by mass of BCF relative to 100 parts by mass of the cellulose nanofiber) was obtained in the same manner as Reference Example 3 except that BCF was used instead of the bisphenol A type epoxy resin.

(Preparation of Vulcanized Rubber Composition)

Using a 6-inch roll, 3 parts by mass of the BCF-CNF composite were added in terms of a solid content to 100 parts by mass of the unvulcanized rubber composition obtained in Reference Example 1 to prepare an unvulcanized rubber composition containing the BCF-CNF composite. A vulcanized rubber composition was obtained from the unvulcanized rubber composition in the same method as Reference Example 1.

Table 2 shows evaluation results of the vulcanized rubber compositions obtained in Reference Examples 1 to 3 and Examples 1 to 3.

TABLE 2

| | | Reference Examples | | | Examples | | |
|---|---|---|---|---|---|---|---|
| | | 1 | 2 | 3 | 1 | 2 | 3 |
| Thickness (mm) | Longitudinal | 1.97 | 1.95 | 1.95 | 1.98 | 1.98 | 1.96 |
| | Transverse | 1.99 | 1.95 | 1.96 | 1.97 | 1.94 | 1.97 |
| Tensile force (N) | Longitudinal | 114.3 | 94.45 | 61.25 | 69.35 | 95.60 | 94.30 |
| | Transverse | 116.6 | 83.3 | 53.45 | 55.50 | 78.70 | 75.90 |
| Tensile strength (MPa) | Longitudinal | 11.7 | 9.7 | 6.2 | 7.0 | 9.6 | 9.6 |
| | Transverse | 11.7 | 8.5 | 5.4 | 5.6 | 8.1 | 7.7 |
| 25% Tensile Stress (MPa) | Longitudinal | 1.3 | 2.4 | 2.4 | 2.5 | 3.2 | 2.9 |
| | Transverse | 1.1 | 1.4 | 1.1 | 1.2 | 1.4 | 1.3 |
| 50% Tensile Stress (MPa) | Longitudinal | 1.9 | 3.3 | 2.9 | 3.0 | 3.8 | 3.4 |
| | Transverse | 1.7 | 2.2 | 1.4 | 1.6 | 2.1 | 1.9 |
| 100% Tensile Stress (MPa) | Longitudinal | 3.2 | 4.4 | 3.3 | 3.5 | 4.7 | 4.3 |
| | Transverse | 2.8 | 3.5 | 2.0 | 2.2 | 3.2 | 2.8 |
| Durometer hardness | | 66.5 | 72.0 | 65.3 | 72.3 | 74.5 | 74.5 |
| Density (g/cm$^3$) | | 1.102 | 1.107 | 1.099 | 1.107 | 1.111 | 1.109 |

As apparent from the results shown in Table 2, the vulcanized rubber compositions obtained in Examples have an excellent balance of tensile properties and rigidity compared with the vulcanized rubber compositions obtained in Reference Examples. In particular, compared with Reference Example 2 containing the cellulose nanofiber modified with the fluorene compound, Examples 1 to 3 (in particular, Examples 2 and 3) have an improved modulus (tensile stress) in the longitudinal direction although Examples 1 to 3 and Reference Example 2 have in common in that the fluorene compound is contained. The results are seemingly caused by a high degree of freedom of the fluorene compound due to no covalent bond between the fluorene compound and the cellulose nanofiber in Examples 1 to 3 compared with Reference Example 2.

Reference Example 4 (SBR/Blank)

Components each having a proportion shown in Table 3 were kneaded at a temperature of 150° C. using a pressure kneader (manufactured by Moriyama Company Ltd., capacity: 10 liters) to prepare an unvulcanized rubber composition. The resulting composition was press-vulcanized at a vulcanization temperature of 180° C. to give a vulcanized rubber composition.

TABLE 3

| Components | Proportion (parts by mass) |
|---|---|
| SBR | 100 |
| CB N234 | 60 |
| Process oil | 5 |
| Zinc white | 4 |
| Stearic acid | 1 |
| Sulfur | 1.8 |
| Accelerator CBS | 1.5 |
| Total | 173.3 |

Reference Example 5 (SBR/Epoxy Resin-CNF Composite)

Using a 6-inch roll, 3 parts by mass of the epoxy resin-CNF composite obtained in Reference Example 3 were added in terms of a solid content to 100 parts by mass of the unvulcanized rubber composition obtained in Reference Example 4 to prepare an unvulcanized rubber composition containing the epoxy resin-CNF composite. A vulcanized rubber composition was obtained from the unvulcanized rubber composition in the same method as Reference Example 4.

Example 4 (SBR/BPFG-CNF Composite)

Using a 6-inch roll, 3 parts by mass of the BPFG-CNF composite obtained in Example 1 were added in terms of a solid content to 100 parts by mass of the unvulcanized rubber composition obtained in Reference Example 4 to prepare an unvulcanized rubber composition containing the BPFG-CNF composite. A vulcanized rubber composition was obtained from the unvulcanized rubber composition in the same method as Reference Example 4.

Example 5 (SBR/BPEF-CNF Composite)

Using a 6-inch roll, 3 parts by mass of the BPEF-CNF composite obtained in Example 2 were added in terms of a solid content to 100 parts by mass of the unvulcanized rubber composition obtained in Reference Example 4 to prepare an unvulcanized rubber composition containing the BPEF-CNF composite. A vulcanized rubber composition was obtained from the unvulcanized rubber composition in the same method as Reference Example 4.

Example 6 (SBR/BCF-CNF Composite)

Using a 6-inch roll, 3 parts by mass of the BCF-CNF composite obtained in Example 3 were added in terms of a solid content to 100 parts by mass of the unvulcanized rubber composition obtained in Reference Example 4 to prepare an unvulcanized rubber composition containing the BCF-CNF composite. A vulcanized rubber composition was obtained from the unvulcanized rubber composition in the same method as Reference Example 4.

Table 4 shows evaluation results of the vulcanized rubber compositions obtained in Reference Examples 4 to 5 and Examples 4 to 6.

TABLE 4

| | | Reference Examples | | Examples | | |
|---|---|---|---|---|---|---|
| | | 4 | 5 | 4 | 5 | 6 |
| Tensile Strength (MPa) | Longitudinal | 25.1 | 17.9 | 17.3 | 19.6 | 18.5 |
| | Transverse | — | 16.6 | 15.6 | 16.5 | 15.6 |
| 25% Tensile Stress (MPa) | Longitudinal | 1.3 | 1.8 | 1.9 | 1.9 | 2.0 |
| | Transverse | — | 1.3 | 1.4 | 1.5 | 1.4 |
| 50% Tensile Stress (MPa) | Longitudinal | 1.8 | 3.0 | 2.8 | 3.1 | 3.4 |
| | Transverse | — | 1.6 | 1.8 | 2.0 | 1.9 |
| 100% Tensile Stress (MPa) | Longitudinal | 3.0 | 3.9 | 3.8 | 4.6 | 5.0 |
| | Transverse | — | 2.2 | 2.6 | 3.1 | 3.0 |
| 200% Tensile Stress (MPa) | Longitudinal | 8.1 | 6.4 | 7.2 | 9.4 | 9.7 |
| | Transverse | — | 4.3 | 5.0 | 6.9 | 7.0 |
| 300% Tensile Stress (MPa) | Longitudinal | 15.2 | 10.7 | 12.2 | 16.1 | 16.1 |
| | Transverse | — | 7.9 | 10.0 | 12.8 | 12.7 |
| Durometer hardness | | 71.1 | 74.3 | 73.1 | 74.9 | 74.9 |
| Density (g/cm$^3$) | | 1.162 | 1.169 | 1.130 | 1.170 | 1.170 |

As apparent from the results shown in Table 4, the vulcanized rubber compositions obtained in Examples have an excellent balance of tensile properties and rigidity compared with the vulcanized rubber compositions obtained in Reference Examples.

Reference Example 6 (SBS/Blank)

SBS was injected by an injection molding machine ("C, MOBILE-0813" manufactured by SHINKO SELLBIC CO., LTD.) to produce a dumbbell specimen having a length of 75 mm, a parallel part width of 5 mm, a parallel part length of 35 mm, and a thickness of 2 mm.

Reference Example 7 (SBS/B-CNF)

Three (3) parts by mass of the modified cellulose nanofiber (B-CNF) obtained in Reference Example 2 were added in terms of a solid content to 100 parts by mass of SBS, and the mixture was melt-kneaded at 200° C. using a twin-screw extruder (manufactured by TECHNOVEL CORPORATION, 15 mmφ, L/D=30) to give a compound. The resulting compound was dried at 80° C. for 24 hours and was then injected by an injection molding machine ("C, MOBILE-0813" manufactured by SHINKO SELLBIC CO., LTD.) to produce a specimen.

Example 7 (SBS/BPEF-CNF Composite)

Four point five (4.5) parts by mass of the BPEF-CNF composite obtained in Example 2 were added in terms of a solid content to 100 parts by mass of SBS, and the mixture was melt-kneaded at 200° C. using a twin-screw extruder (manufactured by TECHNOVEL CORPORATION, 15 mmφ, L/D=30) to give a compound. The resulting compound was dried at 80° C. for 24 hours and was then injected by an injection molding machine ("C, MOBILE-0813" manufactured by SHINKO SELLBIC CO., LTD.) to produce a specimen.

Example 8 (SBS/BCF-CNF Composite)

Four point five (4.5) parts by mass of the BCF-CNF composite obtained in Example 3 were added in terms of a solid content to 100 parts by mass of SBS, and the mixture was melt-kneaded at 220° C. using a twin-screw extruder (manufactured by TECHNOVEL CORPORATION, 15 mmφ, L/D=30) to give a compound. The resulting compound was dried at 80° C. for 24 hours and was then injected by an injection molding machine ("C, MOBILE-0813", manufactured by SHINKO SELLBIC CO., LTD.) to produce a specimen.

Table 5 shows evaluation results of the thermoplastic elastomer compositions obtained in Reference Examples 6 to 7 and Examples 7 to 8.

TABLE 5

|  | Reference Examples | | Examples | |
| --- | --- | --- | --- | --- |
|  | 6 | 7 | 7 | 8 |
| Tensile strength (MPa) | 6.6 | 6.9 | 8.1 | 9.3 |
| Elongation (%) | 1796 | 1941 | 2148 | 2178 |

As apparent from the results shown in Table 5, the thermoplastic elastomer compositions obtained in Examples have both high strength and high elongation compared with the thermoplastic elastomer compositions obtained in Reference Examples.

INDUSTRIAL APPLICABILITY

The rubbery composition of the present invention can be used for various industrial members (e.g., a conveyor belt, a rubber cover roll, a gasket, a print roll, a belt such as a conveyor belt, a seal member such as an oil seal, a packing, and a hose member such as an oil-resistant hose), building members (e.g., a window frame rubber, a damping member such as an anti-vibration rubber, and a carpet backing material), transport equipment members (e.g., an automobile member, a tire, a belt such as a power transmission belt), and electrical and electric device members (e.g., a wire coating). Among them, the rubbery composition is suitably used for, e.g., the seal member, the hose member, the tire, the belt such as the conveyor belt or the power transmission belt, and the anti-vibration rubber.

The invention claimed is:

1. A rubbery composition containing (A) a rubber component, (B) a cellulose, and (C) a fluorene compound having a 9,9-bis (aryl) fluorene skeleton, wherein a covalent bond is absent between the cellulose (B) and the fluorene compound (C).

2. The rubbery composition according to claim 1, wherein the fluorene compound (C) comprises a compound represented by the following formula (1):

[Chem. 1]

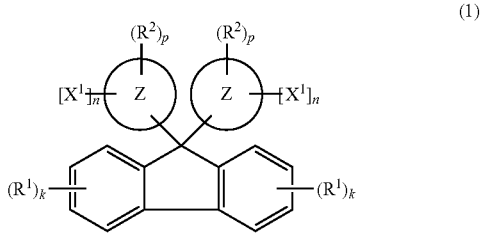

(1)

wherein a ring Z represents an arene ring, $R^1$ and $R^2$ represent a substituent, $X^1$ represents a heteroatom-containing functional group, k denotes an integer of 0 to 4, n denotes an integer of not less than 1, and p denotes an integer of not less than 0.

3. The rubbery composition according to claim 2, wherein, in the formula (1), $X^1$ represents a group —[(OA)$_{m1}$-Y$^1$]:

wherein A represents an alkylene group, $Y^1$ represents hydroxyl group or glycidyloxy group, and m1 denotes an integer of not less than 0.

4. The rubbery composition according to claim 3, wherein $Y^1$ is hydroxyl group.

5. The rubbery composition according to claim 1, wherein the fluorene compound (C) adheres to at least part of a surface of the cellulose (B).

6. The rubbery composition according to claim 1, wherein the cellulose (B) comprises a cellulose nanofiber.

7. The rubbery composition according to claim 1, wherein the rubber component (A) comprises a vulcanizable or crosslinkable rubber and/or a thermoplastic elastomer.

8. The rubbery composition according to claim 1, wherein the rubber component (A) contains at least one member selected from the group consisting of a diene-series rubber and an olefinic rubber.

9. The rubbery composition according to claim 1, wherein the rubber component (A) contains a styrenic thermoplastic elastomer.

10. The rubbery composition according to claim 1, wherein a ratio of the cellulose (B) relative to 100 parts by mass of the rubber component (A) is 0.1 to 30 parts by mass, and a ratio of the fluorene compound (C) relative to 100 parts by mass of the cellulose (B) is 1 to 100 parts by mass.

11. A method for producing a rubbery composition recited in claim 1, the method comprising:
   mixing (A) a rubber component, (B) a cellulose, and (C) a fluorene compound having a 9,9-bis (aryl) fluorene skeleton.

12. The production method according to claim 11, wherein, in the mixing, the cellulose (B) and the fluorene compound (C) having a 9,9-bis (aryl) fluorene skeleton are premixed to prepare a premixture, and the premixture and the rubber component (A) are mixed.

13. The production method according to claim 11, wherein the rubber component (A) is a vulcanizable or crosslinkable rubber, and the method further comprises vulcanizing an unvulcanized rubber composition, which is obtained in the mixing, to give a vulcanized rubber composition.

14. A shaped product formed of a rubbery composition recited in claim 1.

15. The shaped product according to claim 14, which is a hose member, a seal member, a tire, a belt, or an anti-vibration rubber.

* * * * *